US011288409B2

(12) United States Patent
Wawrzyniak et al.

(10) Patent No.: US 11,288,409 B2
(45) Date of Patent: Mar. 29, 2022

(54) METHOD AND SYSTEM FOR DESIGNING ELECTRICAL MACHINES USING REINFORCEMENT LEARNING

(71) Applicant: Hamilton Sundstrand Corporation, Charlotte, NC (US)

(72) Inventors: Beata I. Wawrzyniak, South Windsor, CT (US); Vivek Venugopalan, South Riding, VA (US); Parag M. Kshirsagar, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1004 days.

(21) Appl. No.: 15/920,949

(22) Filed: Apr. 30, 2018

(65) Prior Publication Data

US 2019/0332725 A1 Oct. 31, 2019

(51) Int. Cl.
*G06F 30/00* (2020.01)
*G06N 3/04* (2006.01)
(Continued)

(52) U.S. Cl.
CPC .............. *G06F 30/00* (2020.01); *G06F 30/27* (2020.01); *G06N 3/0427* (2013.01);
(Continued)

(58) Field of Classification Search
CPC .......... G06F 30/00; G06F 30/20; G06F 30/27; G06F 2111/04; G06F 2111/20;
(Continued)

(56) References Cited

U.S. PATENT DOCUMENTS 9,716,422 B2 7/2017 Nishioka
9,792,397 B1 10/2017 Nagaraja
(Continued)

OTHER PUBLICATIONS

Mohammed et al., "Design Optimization of Electromagnetic Devices using Artificial Neural Networks," 1993, IEEE, pp. 361-364 (Year: 1993).*

(Continued)

*Primary Examiner* — Miranda M Huang
*Assistant Examiner* — Catherine F Lee
(74) *Attorney, Agent, or Firm* — Carlson, Gaskey & Olds, P.C.

(57) ABSTRACT

An example method of designing an electrical machine includes providing at least one goal and at least one design constraint for a desired electrical machine to a deep neural network that comprises a plurality of nodes representing a plurality of prior electrical machine designs, the plurality of nodes connected by weights, each weight representing a correlation strength between two nodes. A proposed design is generated from the deep neural network for an electrical machine based on the goal(s) and design constraint(s). A plurality of the weights are adjusted based on a reward that rates at least one aspect of the proposed design. The proposed design is modified using the deep neural network after the weight adjustment. The adjusting and modifying are iteratively repeated to generate subsequent iterations of the proposed design, each subsequent iteration based on the reward from a preceding iteration. A system for designing electrical machines is also disclosed.

18 Claims, 5 Drawing Sheets

(51) Int. Cl.
*G06F 30/27* (2020.01)
*G06N 3/08* (2006.01)
*G06F 111/04* (2020.01)
*G06F 111/20* (2020.01)

(52) U.S. Cl.
CPC ....... *G06F 2111/04* (2020.01); *G06F 2111/20* (2020.01); *G06N 3/04* (2013.01); *G06N 3/0445* (2013.01); *G06N 3/0454* (2013.01); *G06N 3/08* (2013.01)

(58) Field of Classification Search
CPC ............ G06N 20/00; G06N 3/08; G06N 3/04; G06N 3/0427; G06N 3/0445; G06N 3/0454
See application file for complete search history.

(56) References Cited

U.S. PATENT DOCUMENTS

2017/0063284 A1   3/2017   Matsumoto et al.
2017/0093256 A1   3/2017   Murakami

OTHER PUBLICATIONS

Ikeda et al., "ANN Based Designing and Cost Determination System for Induction Motor," IEE Proc.-Electr. Power Appl., vol. No. 6, Nov. 2005, pp. 1595-1602 (Year: 2005).*
Qin et al., "Convolutional Recurrent Neural Networks for Dynamic MR Image Reconstruction," Dec. 5, 2017, arXiv: 1712.01751v1 [cs.CV], pp. 1-9 (Year: 2017).*
Abbeel et al., "Apprenticeship Learning via Inverse Reinforcement Learning," 2004, Proceedings of the 21st International Conference on Machine Learning, 8 pages (Year: 2004).*
Baker et al., "Designing Neural Network Architectures using Reinforcement Learning," 2017, ICLR2017, pp. 1-18 (Year: 2017).*
Koutnik et al., "Evolving Deep Unsupervised Convolutional Networks for Vision-Based Reinforcement Learning," 2014, ACM, GECCO'14, pp. 541-548 (Year: 2014).*
Combined Search and Examination Report for United Kingdom Patent Application No. 1906024.3 completed Oct. 22, 2019.
M. Ikeda & T. Hiyama; "ANN Based Designing and Cost Determination System for Induction Motor," IEE Proc.-Electr. Power Appl., vol. No. 6, Nov. 2005, pp. 1595-1602.

* cited by examiner

METHOD AND SYSTEM FOR DESIGNING ELECTRICAL MACHINES USING REINFORCEMENT LEARNING

BACKGROUND

This application relates to electric machines, and more particularly to designing electrical machines using reinforcement learning.

Electrical machines are machines that convert electrical energy into mechanical energy (e.g., electric motors) or that convert mechanical energy into electrical energy (e.g., electrical generators). Electrical machines include components such as laminations, windings, magnets, etc. Depending on the design of the electrical machine, these components can be either stationary or moving.

Designing an electrical machine is a complex, time-consuming process that is typically based on mathematical equations describing complex physics of the machine (e.g., electromagnetic, mechanical, and thermal properties). These mathematical expressions are frequently limited by current state of art knowledge and limited understanding of inter-dependencies between various machine components, parameters, and conditions. Therefore, these equations are frequently complemented by empirically established coefficients that provide approximation of the actual measurable parameters, followed by computationally intensive finite element procedures. Numerous interim designs may have to be tested and analyzed until an acceptable final design is obtained.

SUMMARY

An example method of designing an electrical machine includes providing at least one goal and at least one design constraint for a desired electrical machine to a deep neural network that comprises a plurality of nodes representing a plurality of prior electrical machine designs, the plurality of nodes connected by weights, each weight representing a correlation strength between two nodes. A proposed design is generated from the deep neural network for an electrical machine based on the at least one goal and the at least one design constraint. A plurality of the weights are adjusted based on a reward that rates at least one aspect of the proposed design. The proposed design is modified using the deep neural network after the weight adjustment. The adjusting and modifying are iteratively repeated to generate subsequent iterations of the proposed design, each subsequent iteration based on the reward from a preceding iteration. A system for designing electrical machines is also disclosed.

An example system for designing electrical machines includes memory storing a deep neural network that comprises a plurality of nodes representing a plurality of prior electrical machine designs, the plurality of nodes connected by weights, each weight indicative of a correlation strength between two nodes. The system also includes a processor operatively connected to the memory and configured to generate a proposed design from the deep neural network for an electrical machine based on at least one goal and at least one design constraint, adjust a plurality of the weights based on a reward that rates at least one aspect of the proposed design, and modify the proposed design using the deep neural network after the weight adjustment. The processor is configured to iteratively repeat the adjustment and modification to generate subsequent iterations of the proposed design, each subsequent iteration based on the reward from a preceding iteration.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
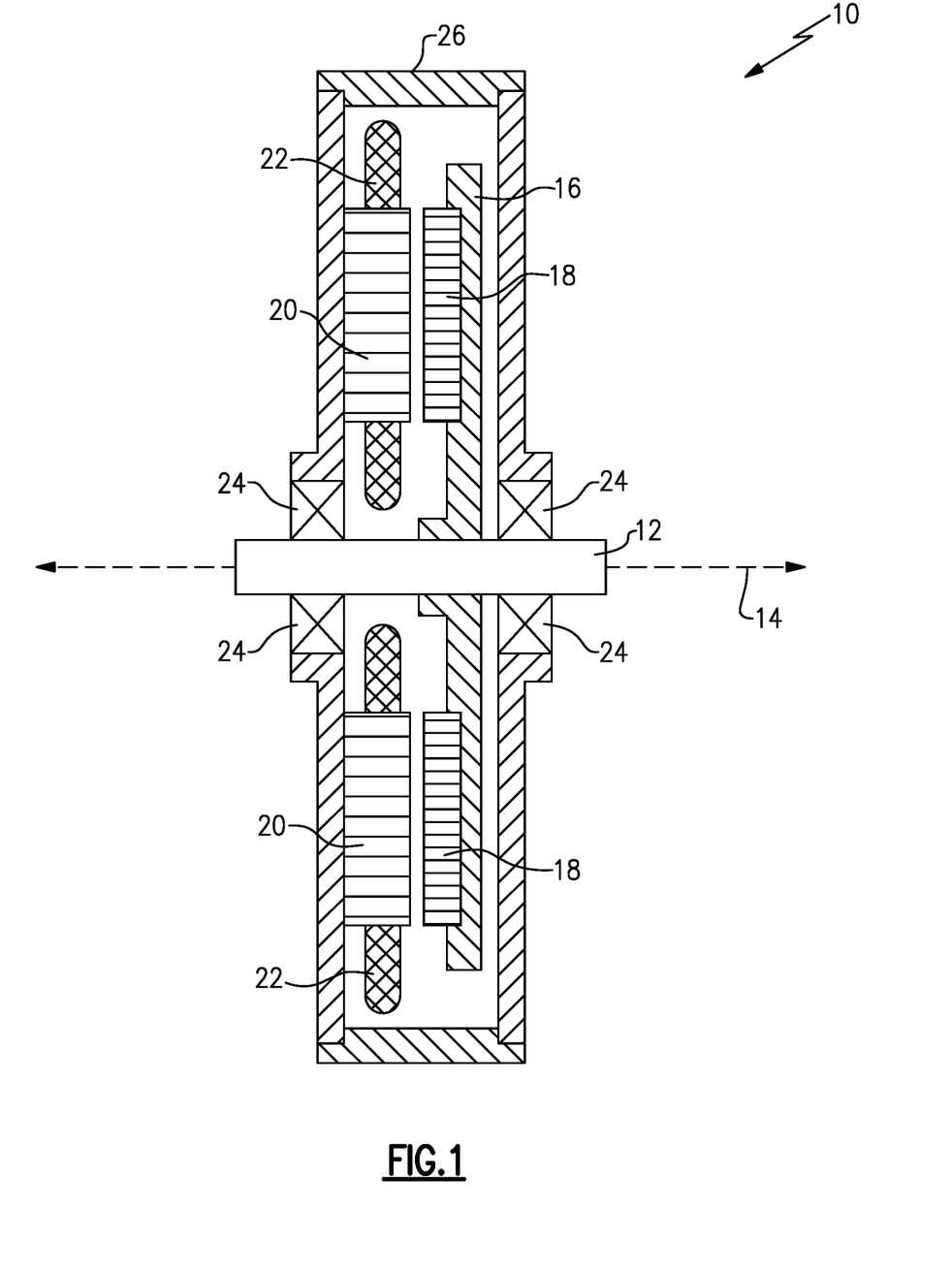
FIG. 1 is a schematic view of an example electric machine.

FIG. 1 is a schematic view of an example electric machine 10 that is an axial flux electrical machine. When configured as motors, axial flux machines are sometimes called "pancake motors" due to their relatively short longitudinal length. The axial electric machine 10 includes a shaft 12 that rotates about a longitudinal axis 14. Rotation of the shaft 12 rotates a rotor 16, to which permanent magnets 18 are attached. A stator core 20 is provided, and a plurality of windings 22 are at least partially disposed within the stator core 20. Bearings 24 assist in rotation of the shaft 12, and a housing 26 surrounds the rotor 16, permanent magnets 18, stator core 20, and windings 22.

If operated as a motor, electrical current is provided in the windings 22 which creates a variation in an electromagnetic field that causes the rotor 16 rotate. If operated as a generator, the shaft 12 and rotors 16 are rotated, which creates a varying electromagnetic field and provides for electrical current in the windings 22.

Even within this one particular design for an axial flux electrical machine 10, many design changes could be made, such as adding additional stages, selecting different materials for the components 16-22, changing a cooling mechanism for the electrical machine 10, changing a size of various ones of the components 16-22, etc. These many design permutations influence the performance of the electrical machine 10. In some instances this influence may be generally understood (e.g., for a radial flux machine, a longer motor generally increases torque but allows for reducing current density). However, the relationship between various design factors may be difficult to predict, as it is believed that there are hidden relationships between certain design parameters and performance aspects.

Figure 2:
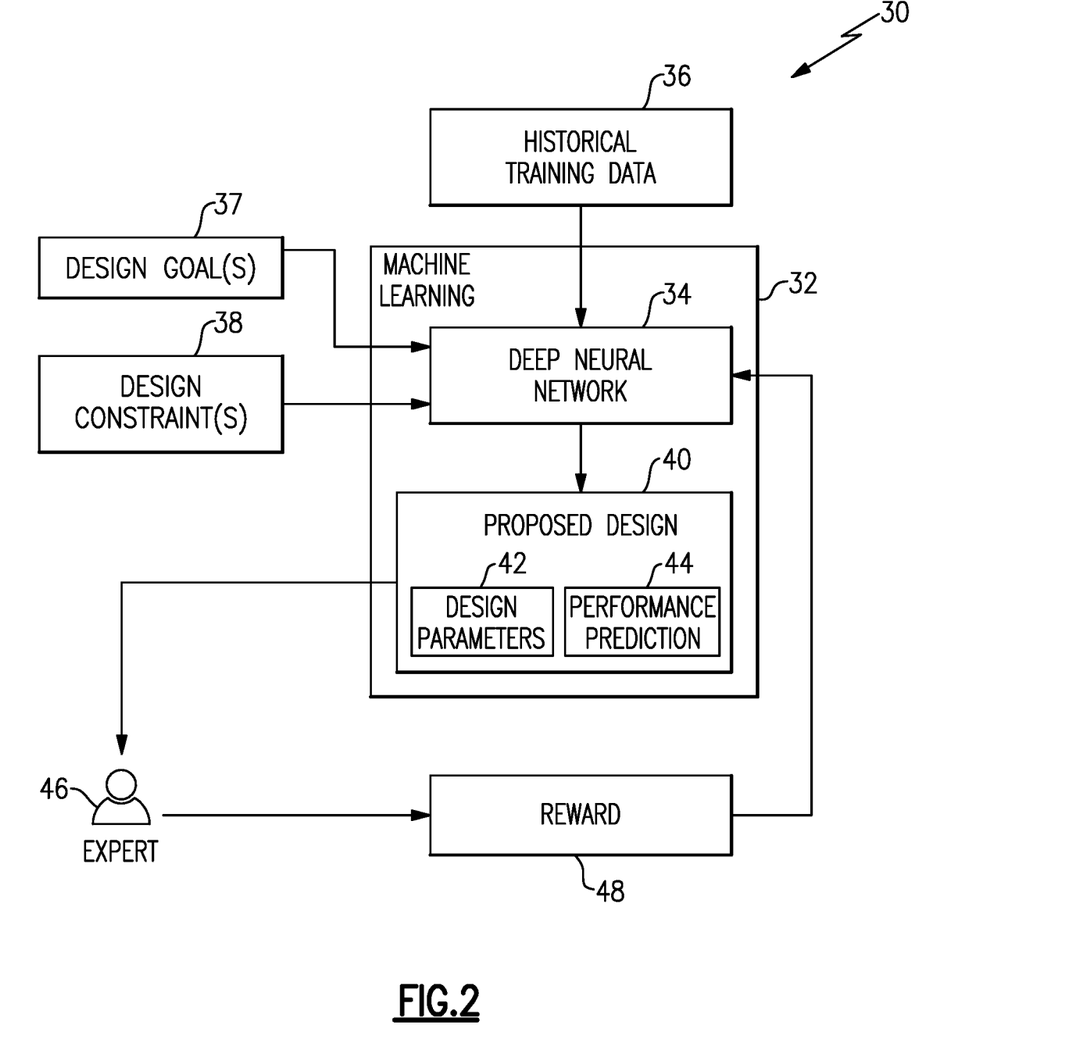
FIG. 2 is a schematic view of an example system for designing electric machines.

FIG. 2 is a schematic view of an example system 30 that utilizes deep reinforcement learning to solve the complex problem of designing efficient electrical machines. In particular, the system 30 utilizes a machine learning subsystem 32 that includes a deep neural network 34. The deep neural network 34 is trained using machine learning from a set of historical training data 36 that represents architectural details and performance data for a plurality of prior electrical machine designs. The deep neural network 34 includes a plurality of nodes that represent these architectural details and performance data. The nodes are connected by weights, with each weight being indicative of a correlation strength between two connected nodes.

After the deep neural network 34 has been trained from the historical training data 36, design parameters for a desired electrical machine are provided to the deep neural network 34. The design parameters include at least one design goal 37 and at least one design constraint 38.

The design goal 37 indicates a desired characteristic of the electrical machine (e.g., a desired power, power density, torque, or torque density), and the design constraint 38 indicates a limitation or restriction for the electrical machine (e.g., a size limitation, a temperature limitation, etc.). In one example, the design constraints 38 include at least one of a structural constraint, a thermal constraint, a cost constraint, and a performance constraint.

The design constraints 38 vary depending on a given application for which a new electrical machine design is desired. Consider an example in which a new design is desired for a replacement electrical motor that is part of an existing larger machine. If there is predefined volume of space available in which to situate the electric motor in the larger machine, then volume could be an important design constraint.

As another example, consider an electric motor that interfaces with an elevator cable in an elevator system. In an elevator system there may be no significant volume constraints on the electric motor, but there may be stringent vibration constraints to prevent excessive vibration from being passed from the electric motor to an elevator car (e.g., an amount of acceptable torque ripple).

Other constraints may be dictated by cost and/or manufacturing considerations. For example, it may be impractical for manufacturing purposes if a given motor for a given application has more than X stages. In such an example, the quantity of stages of the motor could be a design constraint.

The following are a plurality of example design constraints:
  Structural constraints—maximum allowable electrical machine length, maximum allowable electrical machine volume, maximum allowable rotor diameter (e.g., for high speed applications)
  Thermal constraints—maximum acceptable temperature, maximum allowable winding temperature, maximum allowable skin temperature, cooling scheme (e.g., natural, forced air, liquid)
  Cost constraints—maximum allowable cost
  Performance constraints—maximum allowable rotational speed, maximum allowable torque ripple, current density, motor efficiency, rated power, supply voltage.

In one example, some design goals 37 are "primary" goals that have a higher priority, and other design goals 37 are "secondary" goals that have a lower priority. In one particular example, a high priority design goal 37 is to achieve a target torque requirement within a constrained envelope, and a secondary design goal 37 is to utilize a simple cooling scheme. Of course, other goals could be used.

Having been trained from the historical training data 36 for a plurality of prior electrical machine designs, the deep neural network 34 can provide for identification of relationships between design parameters and electrical machine performance that may otherwise difficult to ascertain without machine learning techniques. Consider slot fill factor as an example, which describes an amount of conductor material with respect to available slot area. Typically, a value is assumed based on a rule of thumb, which may lead to underutilization of the available space if a conservative approach is taken or may lead to a design that is impossible to manufacture because an overly aggressive value is assumed. Based on historical data (e.g., torque, size, cooling scheme, motor topology, etc.) the deep neural network 34 can identify an optimum range of slot fill factor at earlier stage of design than would otherwise be possible.

The deep neural network 34 receives the design constraints 38 as inputs and generates a proposed design 40 for an electrical machine based on the design constraints 38 and the historical training data 36. The deep neural network 34 performs an optimization problem and converges to a solution which includes a list of parameters having values which can be vetted/realized through a software modeling tool. The deep neural network 34 acts as a blackbox that can find optimal values for the desired features.

By utilizing its many nodes and weights that indicate the relationships between design parameters and electrical machine performance, the deep neural network 34 determines an optimal combination of design parameters from the previous electrical machine designs based on the design constraints 38.

The proposed design 40 includes design parameters 42 describing architectural details of the proposed design 40, such as a shape, size, and relative location for a plurality of components of the proposed design (e.g., the components 16-22 described in FIG. 1). Some examples of design parameters that could be included in the proposed design 40 include the following:
  Electrical machine topology/flux direction—axial flux, radial flux, transverse flux
  Structure—single stator/single rotor, single stator/dual rotor, dual stator/single rotor, multi-stack (axial flux, transverse flux)
  Excitation—induction, permanent magnet, switched reluctance
  Rotor—interior rotor, exterior rotor
  Winding topology—concentrated windings, distributed windings
  Back EMF—sinusoidal, trapezoidal
  Slots per pole—integral, fractional
  Magnets—magnet quantity, magnet material, magnet position (e.g., embedded, spoke, field concentrating, synchronous reluctance)
  Size—cross sectional size of core, length of core
  Material—type of material to be used for various parts of the electrical machine (e.g., windings, stator, rotor)

In one example, some of the design parameters above are also included as design constraints (e.g., the motor must be a radial flux motor that uses permanent magnets).

The proposed design 40 also includes at least one performance prediction 44 for the proposed design that predict least one of thermal performance, structural performance, mechanical performance, and electromagnetic performance of the proposed design 40. Some examples of these predictions include the following:
  Thermal performance—predicted operating temperatures and hot spot locations for the electrical machine
  Structural performance—structural load, vibration from magnetic field
  Mechanical performance—rotational speed, amount of mechanical torque produced, amount of torque ripple
  Electromagnetic performance—current density, output power, amount of electromagnetic torque produced, torque to rotor volume, power density, etc.

The proposed design 40 is provided to a subject matter expert 46 who has expertise in designing electrical machines and can analyze the feasibility and usefulness of the proposed design 40, and who provides a reward 48 that rates at least one aspect of the proposed design 40 based on its acceptability in relation to the design constraints 48. The reward 48 is provided as feedback to the deep neural network 34, which adjusts its weights based on the reward 48. The subject matter expert 46 can indicate ineffective combinations of machine parameters in the reward 48, to teach the deep neural network 34 what combinations are inefficient, and help the deep neural network 34 avoid inefficient proposed designs in the future. In this regard, the reward 48 serves as additional training data for the deep neural network 34.

For example, the subject matter expert 46 may receive a proposed design 40 for an electrical machine which is long and skinny. The subject matter expert 46 may know from previous experience that such machines are susceptible to wobbling along their rotational axis, and may indicate this to the deep neural network 34 in the reward 48.

As another example, the subject matter expert 46 may have expertise in manufacturing, and may know that an aspect of a proposed design 40 will be impractical for manufacturing (e.g., too many rotor stages, very small features difficult to machine, overly complex structure with many components requiring an overly complicated assembly process).

As another example, the subject matter expert 46 may have a good knowledge of whether harmonics in voltage are higher than acceptable for given operational conditions (e.g., speed) and design properties (e.g., number of poles that high harmonic content in excitation can result with very high core losses (hysteresis/eddy current)), or that certain local temperatures are unacceptably high.

As an example, steel losses are assessed based on a method that refers to measured data provided by manufacturers with respect to fundamental frequency and induction (flux density). The actual losses are projected using curve fitting and some methods of approximation to account for frequency spectrum (harmonics). Sometimes extrapolation must be performed for the ranges that are not provided by manufacturer. It is common to add safety factors on top of calculated values to account for so called stray losses that are also frequency related but still not very well understood/ mathematically described. The reward 48 from the subject matter expert 46 could also be very useful for addressing steel losses.

In one example, the reward 48 locks certain ones of the design parameters from the proposed design 40, and permits or requests changes to other ones of the design parameters in the proposed design 40. The selection of a slot/pole configuration determines an operational frequency of an electric machine and at the same time may enable several different winding schemes (e.g., distributed winding or concentrated winding). In some situations it might be desired to use a certain type of the winding to fulfill other requirements (distributed: lower torque ripples, but larger end windings; concentrated: smaller end windings, but higher torque ripples). "End windings", also known as "end turns" refers to a return conductor path not participating in torque production. Their reduction results in better material utilization/higher power density, and lower cost.

The deep neural network 34 looks at the training data for prior machine designs which are labeled good or bad. This helps the deep neural network 34 to understand the correlation between the input parameters and converge to a proposed design 40 that can replicate a good machine design. The relationship between the parameters for a good machine design is detected by the deep neural network 34.

Figure 3:
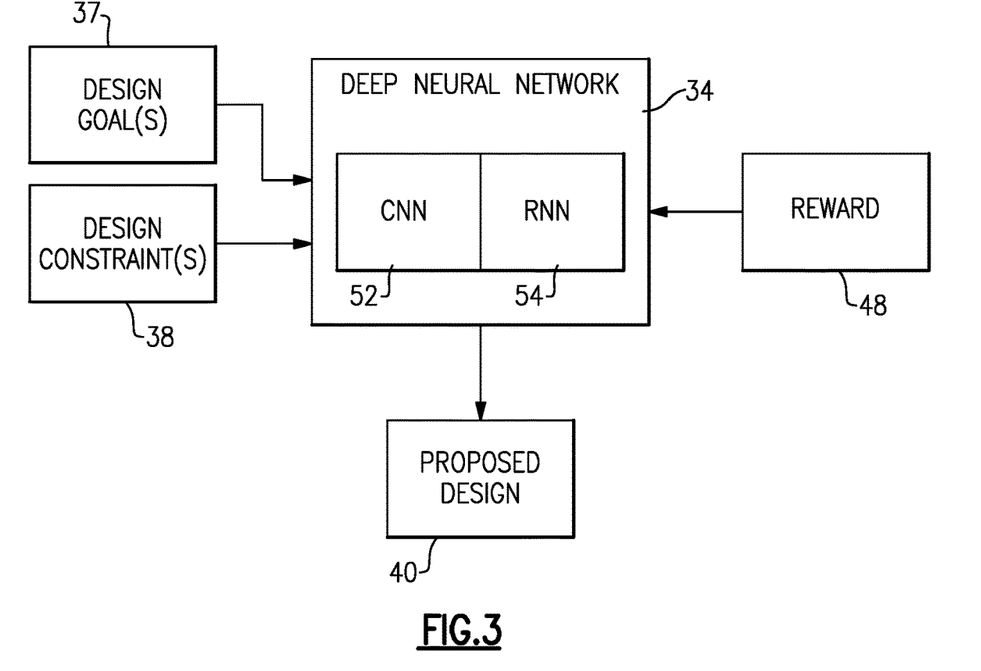
FIG. 3 schematically illustrates components of an example deep neural network.

FIG. 3 schematically illustrates components of an example deep neural network 34 that includes a convolutional neural network (CNN) 52 and a recurrent neural network (RNN) 54. The convolutional neural network 52 exploits spatial relationships between nodes, and the recurrent neural network 54 exploits temporal relationships between nodes. The convolutional neural network 52 and recurrent neural network 54 receive the design goal(s) 37 and design constraint(s) 38 as inputs, and during an initial iteration determines a proposed design 40 for an electrical machine based on the design goal(s) 37 and design constraint(s) 38.

In subsequent iterations, the proposed design 40 and the deep neural network 34 itself are refined. This "refinement" emphasizes the improvement of a model due to the reward assigned to the correct output parameters. This means that while rewarded parameters are constant, the remaining parameters need to be iterated further by the deep neural network 34 and assigned a satisfactory score for the process to stop. As part of the refinement, weights between nodes in the CNN 52 and/or RNN 54 are adjusted.

In the prior art, it is known to use neural networks for character recognition in handwriting. In the realm of character recognition, an example spatial relationship could include a physical arrangement of certain portions of a letter, and a temporal relationship could include an expected letter sequence (e.g., "Q" is often followed by "U").

In the realm of electrical machine design, an example spatial relationship could include the position of magnets, orientation, windings, etc., and an example temporal relationship could include the tracking events/rewards issued through prior iterations.

Recurrent neural networks are generally more computationally intensive to utilize than convolutional neural networks, so utilizing the convolutional neural network 52 in conjunction with the recurrent neural network 54 is less resource-intensive than if only the recurrent neural network 54 were to be used to generate the proposed design 40.

If a reward 48 is received for the proposed design 40, the deep neural network 34 adjusts its weights, and determines a new proposed design 40. This process iteratively repeats, with each new iteration of the proposed design 40 being based on the reward 48 from a preceding iteration.

At least the recurrent neural network 54 adjusts its weights based on the reward 48. In one example, only the recurrent neural network 54 receives the reward 48, adjusts its weights based on the reward 48, and is utilized in modifying the proposed design 40.

In another example, the convolutional neural network 52 also receives the reward 48, adjusts its weights based on the reward 48, and is utilized in modifying the proposed design 40.

In one example, a majority of the weights that are adjusted in a given iteration are part of the recurrent neural network 54.

Figure 4:
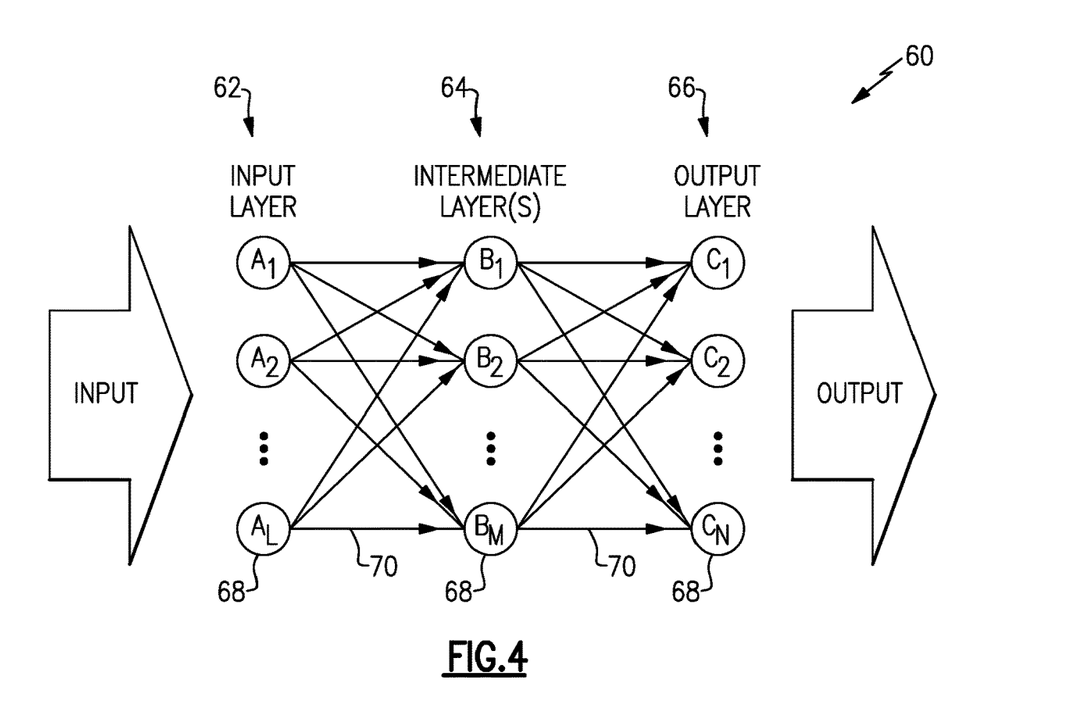
FIG. 4 schematically illustrates an example neural network.

FIG. 4 illustrates an example simplified neural network 60 that could be used for either of the convolutional neural network 52 or the recurrent neural network 54. The neural network 60 includes an input layer 62, a plurality of intermediate layers 64 (one of which is shown in FIG. 4), and an output layer 66. In the convolutional neural network 52, the intermediate layers 64 are known as "hidden layers."

A plurality of nodes 68 are included in the various layers 62, 64, 66. The nodes 68 represent the architectural details and performance data for the plurality of prior electrical machine designs from the historical training data 36. The nodes 68 are connected by weights 70 that indicate a correlation strength between the nodes 68.

The nodes 68 in input layer 62 (labeled as $A_1$-$A_L$) are input nodes that receive input from outside of the neural network 70, and the nodes 68 in the output layer (labeled as $C_1$-$C_N$) are output nodes that provide the proposed design 40 as an output. Modeling software can be used to render the final design if desired (e.g., such as the ANSYS 3-D modeling software) for presentation to the subject matter expert 46.

The input to the input layer 62 includes the design goal(s) 37 and design constraint(s) 38. If a reward 48 is provided for a given iteration, the input to the input layer 62 also includes the reward 48 (at least for the recurrent neural network 54).

The nodes of the intermediate layer(s) 64 (labeled as $B_1$-$B_M$) modify the input data as it passes through the neural network 60 from the input layer 62 to the output layer 66.

Figure 5:
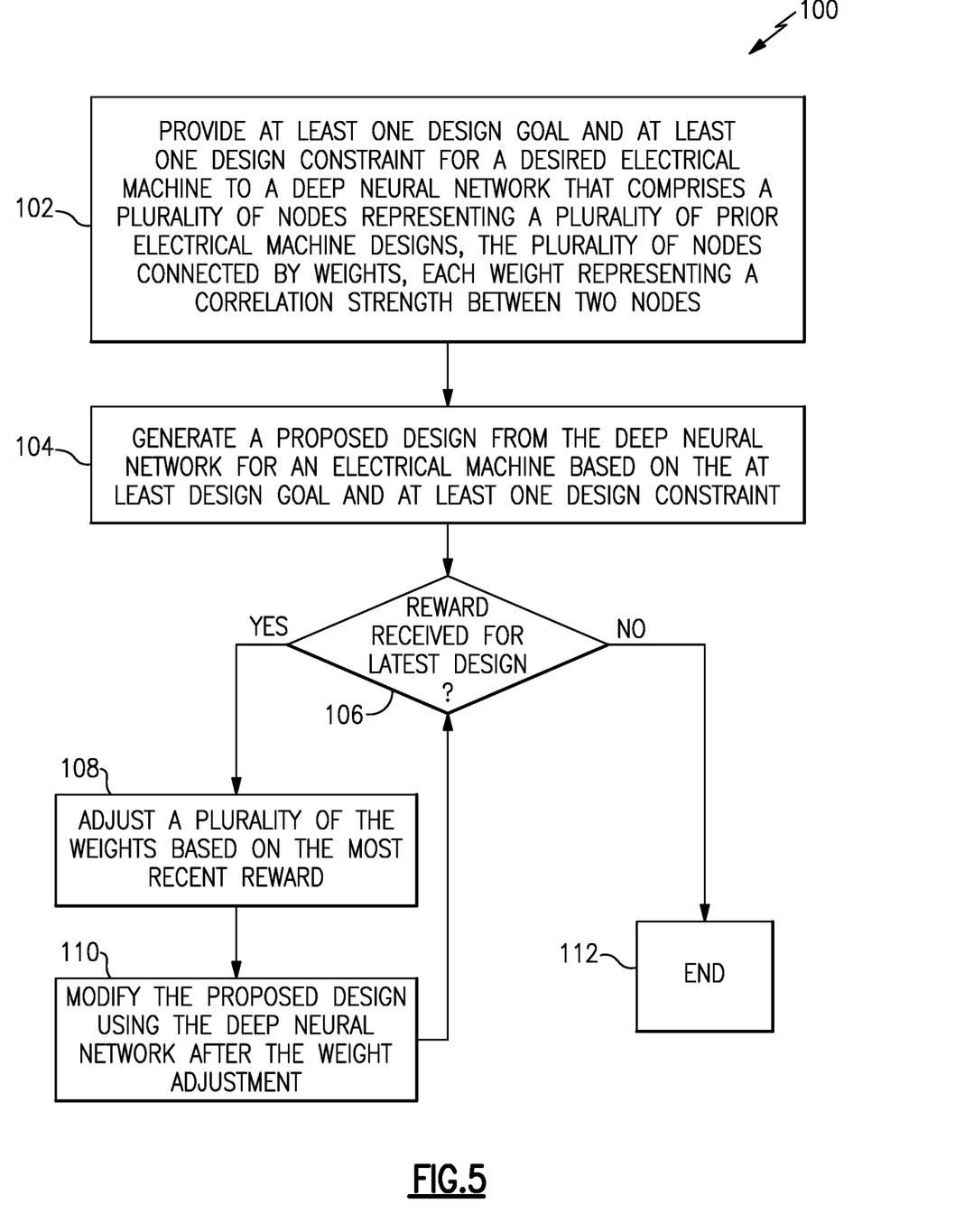
FIG. 5 schematically illustrates an example method of designing an electrical machine using a deep neural network.

FIG. 5 schematically illustrates an example method 100 of designing an electrical machine using a deep neural network. At least one design goal 37 and at least one design constraint 38 for a desired electrical machine are provided to deep neural network 34 (block 102). The deep neural network 34 includes a plurality of nodes 68 representing a plurality of prior electrical machine designs. The plurality of nodes 68 are connected by weights 70, with each weight representing a correlation strength between two nodes 68.

A proposed design 40 is generated from the deep neural network for an electrical machine based on the at least one design goal 37 and at least one design constraint 38 (block 104). If a reward 48 is received for the proposed design 40 that rates at least one aspect of the proposed design 40 in view of the design goal(s) 37 and constraint(s) 38 (a "yes" to block 106), a plurality of the weights 70 are adjusted based on the reward 48 (block 108), and the proposed design 40 is modified using the deep neural network 34 after the weight adjustment (step 110).

If another reward 48 is received for the new iteration of the proposed design 40 (a "yes" to 106), the adjusting of block 108 and modifying of block 110 are iteratively repeated to generate subsequent iterations of the proposed design 40, with each subsequent iteration being based on the reward 48 from an immediately preceding iteration. Otherwise, if no reward is received (a "no" to block 106) the method 100 ends (block 112).

Figure 6:
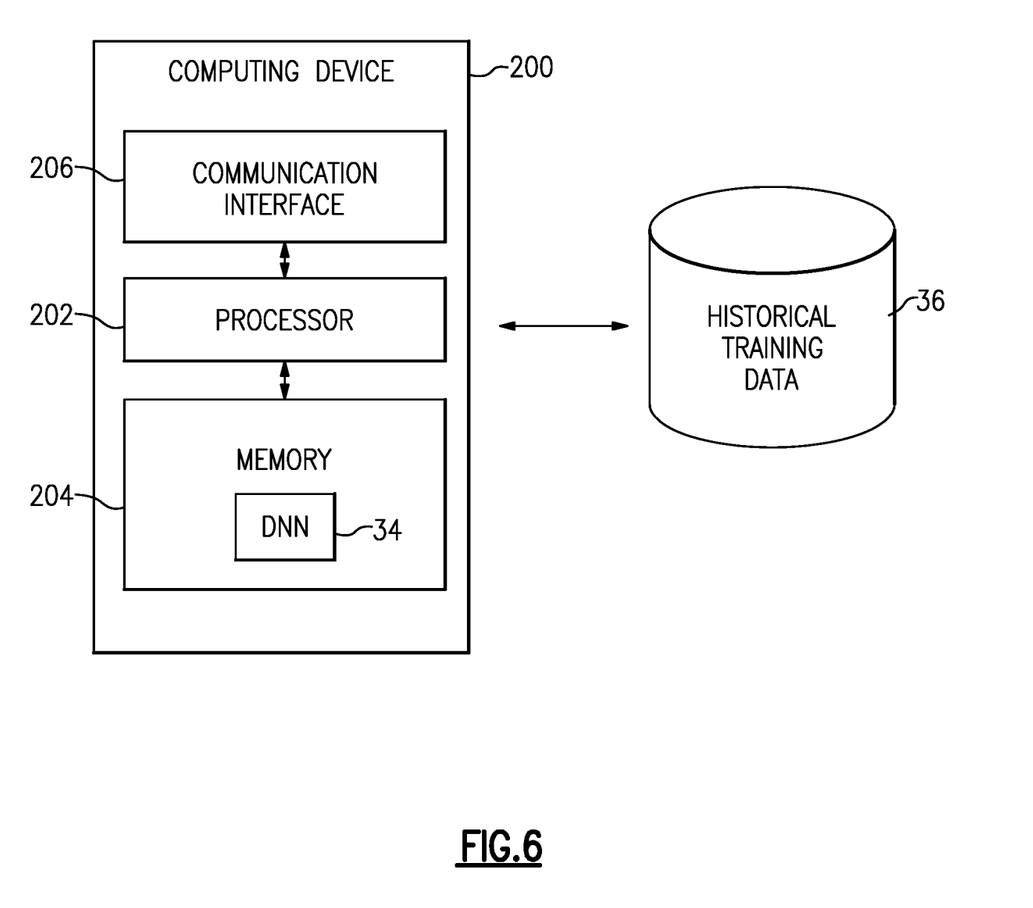
FIG. 6 schematically illustrates an example computing device.

FIG. 6 schematically illustrates an example computing device 200 that is configured to utilize, update, and in some examples create the deep neural network 34. The computing device 200 includes a processor 202 that is operatively connected to memory 204 and a communication interface 206.

The processor 202 includes processing circuitry to perform one or more of the steps of method 100. In one example, the processor 202 is further configured to train and/or create the deep neural network 34 from the historical training data 36. The processor 202 may include one or more microprocessors, microcontrollers, application specific integrated circuits (ASICs), or the like, for example.

The memory 204 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 204 may incorporate electronic, magnetic, optical, and/or other types of storage media. The memory 204 can also have a distributed architecture, where various components are situated remotely from one another, but can be accessed by the processor 202. In one example, the memory 204 stores the deep neural network 34.

The communication interface 206 is configured to facilitate communication with other computing devices (e.g., a computing device of the subject matter expert 46) and with the historical training data 36.

The techniques discussed herein significantly expedite the process of initial electric machine design, and will allow for the prediction of motor specific features more quickly than in the prior art, because the deep neural network 34 is trained with historical knowledge of past designs. Also, the techniques discussed herein facilitate incorporating the effect of system level interactions at an earlier development stage than would otherwise be possible, and without requiring the lengthy finite element analyses that were integral to prior art electrical machine design.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method of designing an electrical machine, comprising:
    providing at least one goal and at least one design constraint for a desired electrical machine to a deep neural network that comprises a plurality of nodes representing a plurality of prior electrical machine designs, the plurality of nodes connected by weights, each weight representing a correlation strength between two nodes;
    generating a proposed design from the deep neural network for an electrical machine based on the at least one goal and at least one design constraint;
    adjusting a plurality of the weights based on a reward that rates at least one aspect of the proposed design;
    modifying the proposed design using the deep neural network after the weight adjustment; and
    iteratively repeating the adjusting and modifying to generate subsequent iterations of the proposed design, each subsequent iteration based on the reward from a preceding iteration;
    wherein the deep neural network comprises:
        a convolutional neural network configured to exploit spatial relationships between its nodes based on the at least one design goal and at least one design constraint; and
        a recurrent neural network configured to exploit temporal relationships between its nodes based on the at least one design goal and at least one design constraint; and
    wherein the nodes of each of the convolutional and recurrent neural networks represent architectural details and performance data for the plurality of prior electrical machine designs.

2. The method of claim 1, wherein the at least one goal comprises a desired power or torque parameter, and wherein the at least one design constraint comprises at least one of a structural constraint, a thermal constraint, a cost constraint, and a performance constraint.

3. The method of claim 1, wherein the proposed design comprises:
    design parameters that describe architectural details of the proposed design; and
    at least one performance prediction for the proposed design.

4. The method of claim 3, wherein the architectural details of the proposed design include a machine topology, a winding topology, a type of excitation, and a material for at least one component of the proposed design.

5. The method of claim 4, wherein the architectural details of the proposed design also include a shape, size, and relative location for a plurality of components of the proposed design.

6. The method of claim 3, wherein the at least one performance prediction predicts at least one of thermal performance, structural performance, mechanical performance, and electromagnetic performance of the proposed design.

7. The method of claim 1, comprising:
training the deep neural network from a set of historical training data comprising design parameters and performance data for the plurality of prior electrical machine designs.

8. The method of claim 1, wherein said generating a proposed design comprises the deep neural network selecting a combination of features from at least one of the prior electrical machine designs for inclusion in the proposed design based on the at least one design constraint and the weights.

9. The method of claim 8, wherein said adjusting a plurality of the weights based on the reward comprises adjusting the weights of at least the recurrent neural network.

10. The method of claim 8, wherein a majority of the weights that are adjusted based on a reward in a given iteration are part of the recurrent neural network.

11. The method of claim 1, comprising, for each proposed design:
providing the proposed design to a subject matter expert user; and
receiving the reward for the proposed design from the subject matter expert user.

12. A system for designing electrical machines, comprising:
memory storing a deep neural network that comprises a plurality of nodes representing a plurality of prior electrical machine designs, the plurality of nodes connected by weights, each weight indicative of a correlation strength between two nodes; and
a processor operatively connected to the memory and configured to:
generate a proposed design from the deep neural network for an electrical machine based on at least one goal and at least one design constraint;
adjust a plurality of the weights based on a reward that rates at least one aspect of the proposed design;
modify the proposed design using the deep neural network after the weight adjustment; and
iteratively repeat the adjustment and modification to generate subsequent iterations of the proposed design, each subsequent iteration based on the reward from a preceding iteration;
wherein the deep neural network comprises:
a convolutional neural network configured to exploit spatial relationships between its nodes based on the at least one design goal and at least one design constraint; and
a recurrent neural network configured to exploit temporal relationships between its nodes based on the at least one design goal and at least one design constraint; and
wherein the nodes of each of the convolutional and recurrent neural networks represent architectural details and performance data for the plurality of prior electrical machine designs.

13. The system of claim 12, wherein the at least one goal comprises a desired power or torque parameter, and wherein the at least one design constraint comprises at least one of a structural constraint, a thermal constraint, a cost constraint, and a performance constraint.

14. The system of claim 13, wherein the proposed design comprises:
design parameters that describe architectural details of the proposed design; and
at least one performance prediction for the proposed design.

15. The system of claim 14, wherein the architectural details of the proposed design include a machine topology, a winding topology, a type of excitation, and a material for at least one component of the proposed design.

16. The system of claim 15, wherein the architectural details of the proposed design also include a shape, size, and relative location for a plurality of components of the proposed design.

17. The system of claim 14, wherein the at least one performance prediction predicts at least one of thermal performance, structural performance, mechanical performance, and electromagnetic performance of the proposed design.

18. The system of claim 17, wherein to adjust the plurality of weights, the processor is configured to adjust the weights of at least the recurrent neural network.

* * * * *